(12) United States Patent
Chen

(10) Patent No.: US 9,645,611 B2
(45) Date of Patent: May 9, 2017

(54) TABLET DOCKING STATION

(71) Applicant: Samuel Chen, Shanghai (CN)

(72) Inventor: Samuel Chen, Shanghai (CN)

(*) Notice: Subject to any disclaimer, the term of this patent is extended or adjusted under 35 U.S.C. 154(b) by 0 days.

(21) Appl. No.: 14/858,625

(22) Filed: Sep. 18, 2015

(65) Prior Publication Data

US 2017/0083050 A1    Mar. 23, 2017

(51) Int. Cl.
| | |
|---|---|
| H05K 7/00 | (2006.01) |
| G06F 1/16 | (2006.01) |
| B05B 11/00 | (2006.01) |
| B05B 12/00 | (2006.01) |
| G06F 3/0484 | (2013.01) |
| B05B 15/08 | (2006.01) |
| E04H 15/42 | (2006.01) |
| H02J 7/35 | (2006.01) |
| F21S 8/08 | (2006.01) |
| F21V 33/00 | (2006.01) |
| F21Y 101/02 | (2006.01) |
| F21W 131/10 | (2006.01) |

(52) U.S. Cl.
CPC ........ *G06F 1/1632* (2013.01); *B05B 11/0002* (2013.01); *B05B 11/0091* (2013.01); *B05B 12/002* (2013.01); *B05B 15/08* (2013.01); *E04H 15/42* (2013.01); *F21S 8/086* (2013.01); *F21V 33/008* (2013.01); *G06F 3/0484* (2013.01); *H02J 7/35* (2013.01); *F21W 2131/10* (2013.01); *F21Y 2101/02* (2013.01)

(58) Field of Classification Search
CPC ...................................................... A45B 23/00
USPC ................................................... 361/679.01
See application file for complete search history.

(56) References Cited

U.S. PATENT DOCUMENTS

| | | | |
|---|---|---|---|
| 7,537,015 B1* | 5/2009 | Molnar, IV ............ | A45B 23/00 108/50.12 |
| 2009/0056775 A1* | 3/2009 | Kuelbs ..................... | A45B 3/04 135/16 |
| 2016/0037966 A1* | 2/2016 | Chin ........................ | A23L 1/01 426/231 |

* cited by examiner

*Primary Examiner* — Jerry Wu
(74) *Attorney, Agent, or Firm* — Clement Cheng

(57) ABSTRACT

A tablet docking station comprising a tablet dock configured for receiving a tablet, an upper post extending from the tablet dock, and an extension arm extending from the upper post. The spray tubing can be mounted to the extension arm. The spray tubing provides a water mist for cooling a user when the spray is activated. The tablet docking station optionally includes a fan assembly including a fan housing. The spray tubing has one or more spray outlets configured to provide a water mist for evaporative cooling of an area near a user. The tablet docking station may provide an electronic control for the fan assembly providing a fan control speed adjustable by a graphical user interface on the tablet.

4 Claims, 2 Drawing Sheets

TABLET DOCKING STATION

FIELD OF THE INVENTION

The present invention is in the field of tablet docking stations.

DISCUSSION OF RELATED ART

Tablet computers have become more popular such as with Android™ and iPad™ panel personal computers since the advent of more powerful and energy-efficient processors and related chipsets. Tablets can be docked to a housing having a charging port and fan, such as described in U.S. Pat. No. 6,837,058, to inventor Mc Euen, issued Jan. 4, 2005 entitled Tablet Air Cooling Dock the disclosure of which is incorporated herein by reference. Tablet docks typically are connected to a wiring harness through an electrical connector and provide battery charging for the tablet computer as well as data transfer to peripherals. The tablet computer typically has a touchscreen which is accessible when the tablet is docked. Smart phones are also tablet computers which now have touchscreen capability as well as CDMA and GSM radio functionality. Smart phones also have docks for charging and providing music functionality since they are also small versions of tablet computers.

SUMMARY OF THE INVENTION

A tablet docking station comprising a tablet dock configured for receiving a tablet, an upper post extending from the tablet dock, and an extension arm extending from the upper post. The spray tubing can be mounted to the extension arm. The spray tubing provides a water mist for cooling a user when the spray is activated. The tablet docking station optionally includes a fan assembly including a fan housing. The spray tubing has one or more spray outlets configured to provide a water mist for evaporative cooling of an area near a user. The tablet docking station may provide an electronic control for the fan assembly providing a fan control speed adjustable by a graphical user interface on the tablet.

Additionally, a canopy shade can be attached to the extension arm for shading a user. A photovoltaic element is preferably formed on an upper surface of the canopy shade. The photovoltaic element provides an electric current for the tablet dock. An LED light can be mounted on the extension arm to provide light for a user. An electronic lighting control for the LED light can allow the electronic lighting control to be adjustable by a graphical user interface on the tablet, such as a slider bar shown on the tablet screen. An optional heat sensor can be mounted on a cooking device such as a smoker or barbecue grill so that the heat sensor sends a temperature signal to the tablet. The central processing unit of the tablet can integrate the temperature signal over time for providing a cooking program that terminates by alerting a user using an alarm that is provided on the tablet by the tablet operating system. Preferably, a niche receives a tablet area for receiving a tablet. The tablet docking station also preferably includes a tablet shade formed on the tablet dock.

BRIEF DISCUSSION OF THE DRAWINGS

Figure 1:
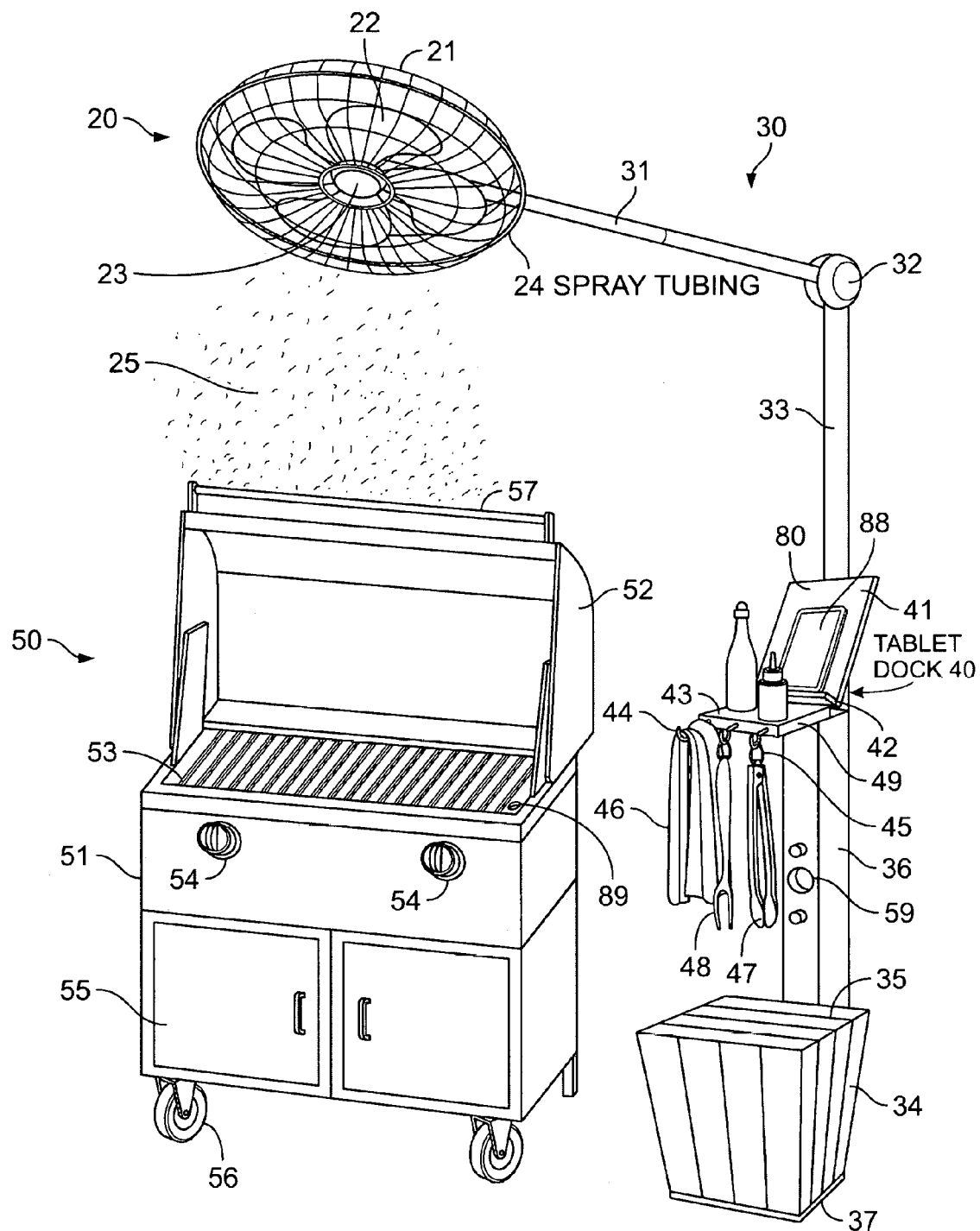
FIG. 1 is a diagram of a tablet docking station with a fan assembly.

The following call out list of elements can be a useful guide in referencing the elements of the drawings.
20 fan assembly
21 fan housing
22 fan blade
23 led light
24 spray tubing
25 spray mist
26 canopy shade
27 spray tubing openings
31 extension arm
32 arm joint
33 upper post
34 insulated chest
35 chest lid
36 base post
37 chest base
38 base footing
40 tablet dock
41 angled resting plank
42 tablet connector base
43 table top
44 towel hook
45 tongs hook
46 towel
47 tongs
48 fork
49 table side
50 bbq grill
51 grill frame
52 grill cover
53 cooking surface
54 flame control knob
55 storage cabinet
56 wheel
57 grill cover handle
58 table arm extension
59 speakers
80 tablet area
81 tablet shade
82 tablet niche
88 tablet
89 heat sensor

DETAILED DESCRIPTION OF THE PREFERRED EMBODIMENT

The present invention is a tablet docking station for a tablet 88 having a tablet dock 40 which has been optimized for barbecue outdoor usage. The tablet dock is preferably an electrical connector that is connected to a wire harness and the wire harness can be powered by a photovoltaic panel on the shade, or by a direct current power supply which has a plug for receiving household electric current in an alternating current standard that is converted to direct current at the tablet dock. The electrical connector can be a standard or proprietary electrical connector and can be recessed as part of the tablet dock 40, or can be separately formed on the tablet dock 40 with a power cord, data cord or a combination power and data cord.

The tablet rests on a tablet area 80 that is defined between an angled resting plank 41 and a tablet connector base 42. The tablet area 80 is a resting area for the tablet. The angled resting plank 41 is preferably perpendicular to the tablet connector base 42. The angled resting plank 41 can have a nonslip surface such as a silicone outside layer. The tablet area 80 optionally is covered by a tablet shade 81 for defining a tablet niche 82. The tablet niche 82 provides shelter from light and water elements to allow a tablet 88 to be used outdoors.

The base post 36 supports an upper post 33 that can be telescopically retracted into the base post 36. The upper post 33 can terminate at an arm joint 32 at an upper end of the upper post 33. The arm joint 32 is preferably adjustable such as by releasing when a circular button like latch is depressed on a side of the arm joint 32. The arm joint 32 provides an adjustable angle for an extension arm 31. The extension arm 31 is likewise telescopically adjustable to provide for different geometric configurations and heights of users.

The tablet dock 40 is supported by a base post 36. The base post 36 has a lower end that acts as a footing on the ground. Additionally, the base post 36 can be structurally stabilized by being connected to an insulated chest 34. The insulated chest preferably includes a chest base 37 and a chest lid 35. The chest lid 35 can swivel, or can be a removable lid. The insulated chest 34 can be an ice chest if it is made to hold ice and water. The insulated chest 34 can further include a spigot for draining water. The insulated chest 34 can have a refrigeration feature if supplied with a refrigeration unit such as a thermoelectric Peltier cooler, or a traditional compressor and evaporator refrigeration unit.

The base post 36 is preferably hollow and can hold speakers 59 mounted on an outside surface of the base post 36. The base post 36 has an upper end that supports the tablet dock 40 and also supports a table having a table top 43 and a table side 49. The table side 49 can include a plurality of hooks including a towel hook 44, a fork hook, and a tongs hook 45. The towel hook 44 can hold a towel 46 suspended from the towel hook 44. The fork hook can hold a fork 48 suspended from the fork hook. The tongs hook 45 can hold a pair of tongs 47 suspended from the tongs hook 45. The tabletop 43 can be rigidly or swivel mounted to the base post 36 so as to be adjustable in position for allowing a swiveling of the tabletop 43 and optionally a swiveling of the tablet dock 40. The tablet dock 40 can be connected, or independent of the table top 43. Optionally, the table is connected to the base post 36 by a table arm extension 58. The table arm extension 58 can be telescopically mounted or swivel mounted to provide an adjustable configuration. The base post 36 can have a wide bottom portion that terminates at a base footing 38 to provide stability. The base footing 38 can be weighted to provide stability by a metal, or sandbag or water bag weight for example.

A canopy shade 26 and/or a fan assembly 20 can be attached to the extension arm 31. The canopy shade 26 can be at least partially photovoltaic to provide an electrical charging source for the tablet computer 88. Direct current can be passed from the canopy shade 26 through an electrical cable down to the tablet connector base 42 and optionally mediated by a battery or charge controller. The electrical cable can supply a direct current voltage and provide the tablet 88 with electrical charging through the tablet connector base 42. The tablet connector base 42 can be made as an electrical connector, or can have an electrical connector that connects the tablet 88 to an electrical cable. The electrical cable can be part of an electrical cable harness that connects to speakers 59 for playing sound files from the tablet 88. The electrical cable harness can fit inside the base post 36, upper post 33 and an extension arm 31 when the base post 36, upper post 33 and the extension on 31 are made as hollow members. The electrical harness can also have an alternating current AC plug for connecting to household current.

The canopy shade 26 can be formed as a rectangular member, which can also shade a fan assembly that is underneath the canopy shade 26. The canopy shade 26 can include a flexible photovoltaic panel mounted on an upper surface of the canopy shade 26 that conforms to a curve of the canopy shade 26. The canopy shade 26 can be made in other shapes such as an umbrella shape. Spray mist tubing 24 can emit a mist through mist nozzles or small openings formed on the spray mist tubing 24.

The spray mist tubing 24 can be pressurized using garden hose pressure and controlled by a misting valve having a valve handle such as when a garden hose is connected to the spray mist tubing 24 such as at a threaded garden hose adapter socket that is configured to receive a garden hose thread. Alternatively or in conjunction with regular garden hose pressure, AC current can provide power for a water pump that pumps water through a spray tubing 24 to provide spray mist 25. Spray tubing 24 can have spray tubing openings 27 that direct spray mist or water on or near a user for providing evaporative cooling on a hot dry day. Spray tubing 24 can be disposed around a fan housing 21 such as on a circumferential periphery of the fan housing 21 as seen in FIG. 1. The fan housing 21 is preferably a wire grille housing and can be made in a circular configuration to match a circular oriented fan. The fan can have four fan blades 22 that rotate within the fan housing 21 to direct spray mist 25 toward a user when a user is operating a barbecue grill 50 on a hot and dry day. The present invention could work with a variety of different outdoor cooking devices such as a barbecue grill 50, smoker or the like. The fan assembly 20 includes a fan mounted within a fan housing 21. The fan assembly 20 is mounted on the extension on 31 and the spray tubing 24 that sprays water can pass through a hollow portion of the extension arm 31. The spray tubing 24 can be also be externally mounted to the fan housing 21. The fan assembly 20 optionally includes an LED light 23 that provides a light during dusk hours of barbecue grill 50 operation.

The barbecue grill 50 preferably includes a cooking surface 53 mounted on a grill frame 51. The grill frame 51 also preferably includes a flame control knob 54 mounted on the grill frame 51. Below the flame control knob 54, a storage cabinet 55 can store a propane tank. The barbecue grill 50 also has wheels 56 for ease of adjustment. A heat sensor 89 can provide a wired or wireless signal to the tablet 88 so that the tablet optionally has a remote sensor capability to provide barbecue cooking programs on a screen of the tablet 88. The heat sensor 89 can also be mounted on the grill cover 52 and can be powered by means such as a thermoelectric Peltier module instead of a battery.

Figure 2:
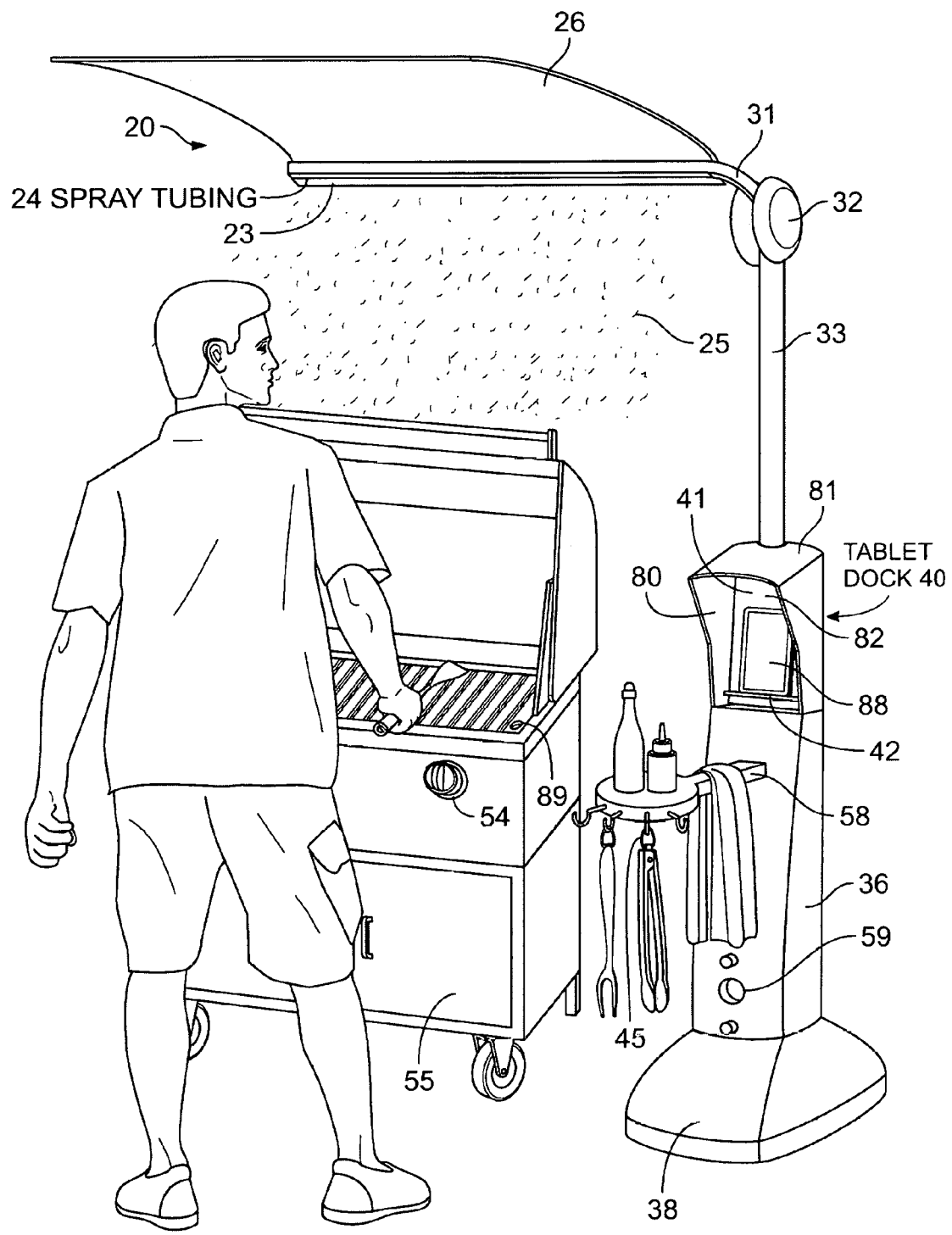
FIG. 2 is a diagram of a tablet docking station with a shade.

When the canopy shade 26 is formed as a rectangular sheet as seen in FIG. 2, an axial or radial fan can be disposed internally within the extension arm 31 to provide a flow of air toward a user.

Alternatively, the fan can be external to the extension arm 31. For example, the canopy shade can have a slot opening along the extension arm 31 where the slot opening provides an air outlet for air that is driven toward the user by the fan. Alternatively, the canopy shade can provide the spray mist 25 without forced air from the fan. The spray mist 25 provides an evaporative environmental cooling for a user such as a user standing in front of the barbecue grill 50 as shown in FIG. 2. An edge of the extension on 31 can attach to an edge of the canopy shade 26.

A program on the tablet 88 can activate the rotation of the fan blades 22, provide the activation of the light 23, provide the activation of water passing through the spray tubing 24 and provide an indicator based upon an output of a heat sensor 89. The tablet 88 has a CPU that can monitor the status of the fan, light, photovoltaic charging, and water delivery through the spray tubing while having a programmed cooking schedule based upon heat sensor 89. Thus, the tablet 88 provides an environmental control for both a user and cooking device.

The invention claimed is:

1. A tablet docking station comprising:
   a. an insulated chest attached to a base post that supports a table having a table top and a table side;
   b. a tablet dock with tablet connector base configured for receiving electrical signals of a tablet, wherein the tablet dock is connected to the base post at a height above the insulated chest;
   c. an upper post extending from the tablet dock and passed a through hole of a tablet shade, wherein an resting plank is perpendicular to the tablet connector base and angled with the upper post within the table shade;
   d. an extension arm extending from the upper post, wherein a spray tubing is mounted along a lower edge of the extension arm, wherein spray tubing provides a water mist for cooling a user;
   e. a canopy shade attached along an upper edge of the extension arm for shading a user; and
   f. a photovoltaic element formed on an upper surface of the canopy shade, wherein the photovoltaic element provides an electric current for the tablet dock;
   g. an LED light mounted on the extension arm to provide light for a user; and
   h. an electronic lighting control for the LED light, wherein the electronic lighting control is adjustable by a graphical user interface on the tablet.

2. The tablet docking station of claim 1, further comprising: a niche that receives a tablet area for receiving a tablet, wherein the tablet dock is mounted in the niche.

3. The tablet docking station of claim 1, further comprising: speakers supported by the base post, wherein the speakers are electrically connected to the tablet dock.

4. The tablet docking station of claim 1, further comprising: a tablet shade formed on the tablet dock.

* * * * *